United States Patent [19]
Brown

[11] Patent Number: 5,957,503
[45] Date of Patent: Sep. 28, 1999

[54] QUICK DISCONNECT SAFETY SHIELD

[76] Inventor: William E. Brown, 817 N. 48th St., Pensacola, Fla. 32506

[21] Appl. No.: 08/822,485

[22] Filed: Mar. 24, 1997

Related U.S. Application Data

[63] Continuation-in-part of application No. 08/566,586, Nov. 30, 1995, Pat. No. 5,678,864.

[51] Int. Cl.[6] ........................................... F16L 35/00
[52] U.S. Cl. .................... 285/13; 285/45; 285/365
[58] Field of Search ................... 285/13, 45, 53, 285/117, 121, 365; 137/377, 382

[56] References Cited

U.S. PATENT DOCUMENTS

| | | | |
|---|---|---|---|
| 4,405,161 | 9/1983 | Young et al. | 285/45 |
| 4,600,220 | 7/1986 | Agnelli | 285/45 |
| 5,489,124 | 2/1996 | Nee et al. | 285/45 |
| 5,678,864 | 10/1997 | Brown | 285/45 |
| 5,718,265 | 2/1998 | Elsdon et al. | 285/45 |

*Primary Examiner*—Eric K. Nicholson
*Attorney, Agent, or Firm*—George A. Bode; Michael L. Hoelter; Bode & Associates

[57] ABSTRACT

A safety shield, suitable for use in a marine environment, which can be quickly and easily removed from around the end flange of a pipeline or hose. It is used to aid in the containment of any leaking fluid from the end flange, such escaping fluid being collected in a drip barrel or the like. The shield incorporates a housing, open at the bottom, with a notch in the front wall for a pipeline to pass through. The housing is fastened to the pipeline by selectively engaging or disengaging the outer circumference of the end flange with an adjustable open annular ring or strap. A window may be included in the top wall of the housing of this shield so that the user can view the end flange prior to installation and/or removal.

20 Claims, 8 Drawing Sheets

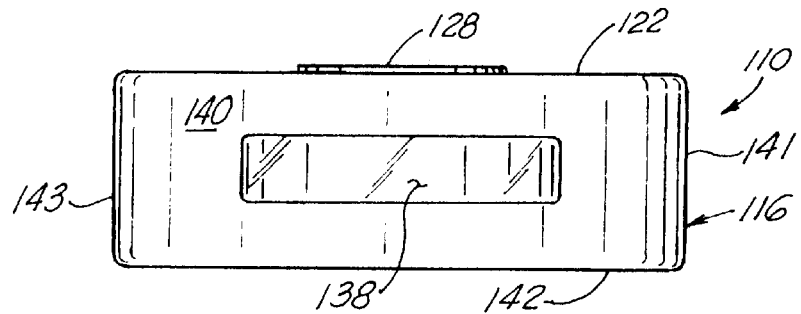
FIG. 9
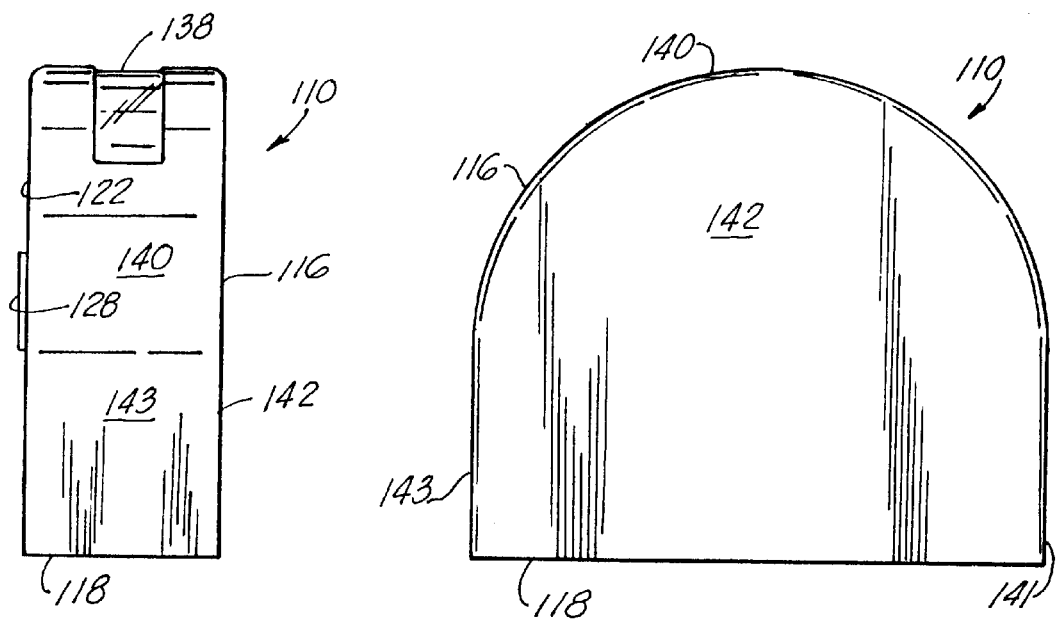
FIG. 8
FIG. 11
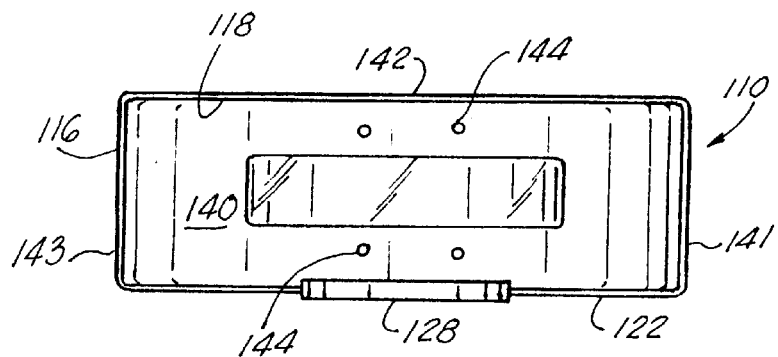
FIG. 10

QUICK DISCONNECT SAFETY SHIELD

This application is a continuation-in-part application of a previous application by the same inventor bearing U.S. Ser. No. 08/566,586 filed Nov. 30, 1995, now U.S. Pat. No. 5,678,864 issued Oct. 21, 1997. The entire previous U.S. application Ser. No. 08/566,586 is incorporated herein by reference as if set forth in full below.

BACKGROUND OF THE INVENTION

1. Field of the Invention

This invention pertains to marine piping systems in general and more particularly to a means of quickly covering and uncovering the connections thereof to control and contain any discharge that might occur.

2. General Background

Many devices currently exist that are used to contain leaks in piping systems. Some, such as U.S. Pat. No. 333,412 issued to Hoeveler, pertain to a coupling that is used to join two pipe ends together. Others, such as U.S. Pat. No. 3,001,801 issued to Downing, pertain to an expansion joint with bellows that also incorporates a drain line for draining away any fluid that may collect therein. U.S. Pat. No. 347,084 issued to Blackmore, et al., discloses a casing for use in natural gas pipelines to prevent gas leakage at the joints or couplings.

A more elaborate device is disclosed in U.S. Pat. No. 5,141,256 issued to Ziu which basically surrounds a first pipeline and fittings with a second pipeline and fittings. Thus, for each line, there would be two separate pipelines, one being spaced from and inside the other.

As can be imagined, some devices are designed specifically for certain components of the pipeline. For example, U.S. Pat. No. 2,954,797 issued to Dryer discloses a housing for a valve that is secured along a pipeline. This housing is quite complicated since it must not only cover the valve body, but also its flanges and valve stem as well.

Devices designed specifically for use with pipe flanges include U.S. Pat. No. 798,649 issued to Willink; U.S. Pat. No. 2,699,960 issued to Callery, et al.; and, U.S. Pat. No. 5,312,137 issued to Nee. All of these devices comprise two separate parts which are rigidly secured together around the pipeline. They also each fully enclosed the flange thereby creating an internal reservoir for the capture of any fluid that may leak from the pipe fitting. Thus, in some of them, a means of draining off any fluid collected therein via a vent pipe or valve is also disclosed. Also, with respect to Nee, his covering is vapor tight such that pressure gauges are built into the device. Furthermore, these devices are rigidly secured around the pipe fitting, some by bolts others via interlocking buttons.

While each of the above devices may operate as desired, none of them are quick disconnecting. Instead, a considerable amount of time and energy must be utilized to not only install such devices, but to remove them as well. This is not acceptable in the marine environment which must employ coverings that can be immediately removed at a moments notice, such as is needed should bad weather, fire, or some other emergency arise, especially at war time such as when re-fueling.

For these reasons, it is an object of this invention to provide a quick disconnecting marine safety shield for use in protecting equipment and personnel from leaks in pipe flanges and the like.

Another object of this invention is to provide a safety shield for leaking pipe flanges that is flexible and can be installed whether the seas are rough or calm.

It is yet another object of this invention to provide a safety shield that is not size dependent but instead is capable of being used on a great many different pipe flange sizes and shapes.

Another object of this invention is to provide a safety shield that can optionally incorporate a window therein so as to enable the user to view the flange from a safe position and ascertain the scope and direction of any leak that might occur.

A further object of this invention is to provide a safety shield that can accommodate a considerable amount of wake or vessel movement.

Yet another object of this invention is to provide a safety shield that does not completely surround or enclose the flange, but instead incorporates a bottom that is open to the atmosphere such that any leaking fluid can be discharged into a drip barrel or the like if so desired.

Still another object of this invention is to provide a one-piece shield that is not air tight nor does it contain a reservoir which itself can fill-up and leak. These and other objects and advantages of this invention will become obvious upon further investigation.

SUMMARY OF THE PRESENT INVENTION

The preferred embodiment of the apparatus of the present invention solves the aforementioned problems in a straightforward and simple manner. This invention pertains to a safety shield that is used to cover or surround an end flange of a pipeline or hose. It consists of a single unitary housing having front, back and top sides and having a bottom or lower side which is open to the atmosphere. A notch or cut-out is made in the front side of the housing with this notch or cut-out being configured to accept the pipeline or hose therein. The end or apex of this notch is generally centrally located within this side of the housing. In order to retain the housing in place, a means of attachment is included that properly positions the housing with respect to the end flange. This means of attachment consists of an open annular ring whose diameter can be adjusted or varied in order to selectively engage or disengage the outer circumference of the end flange.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 8 is a right side elevation view of the alternate embodiment of FIG. 6;

FIG. 9 is a top plan view of the alternate embodiment of FIG. 6;

FIG. 10 is a bottom plan view of the alternate embodiment of FIG. 6;

FIG. 11 is a rear elevation view of the alternate embodiment of FIG. 6;

DETAILED DESCRIPTION OF THE PREFERRED EMBODIMENT

Figure 1:
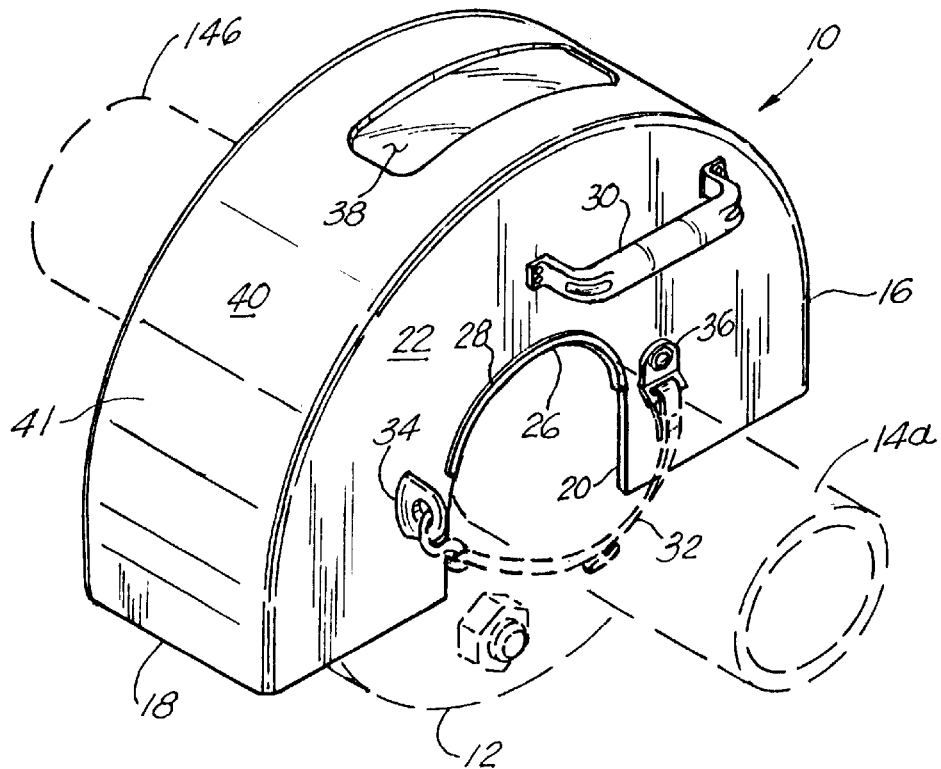
FIG. 1 is a top, front and left side perspective view of one embodiment of the in-line safety shield with the pipe and flange that is covered being illustrated in phantom lines.
Figure 2:
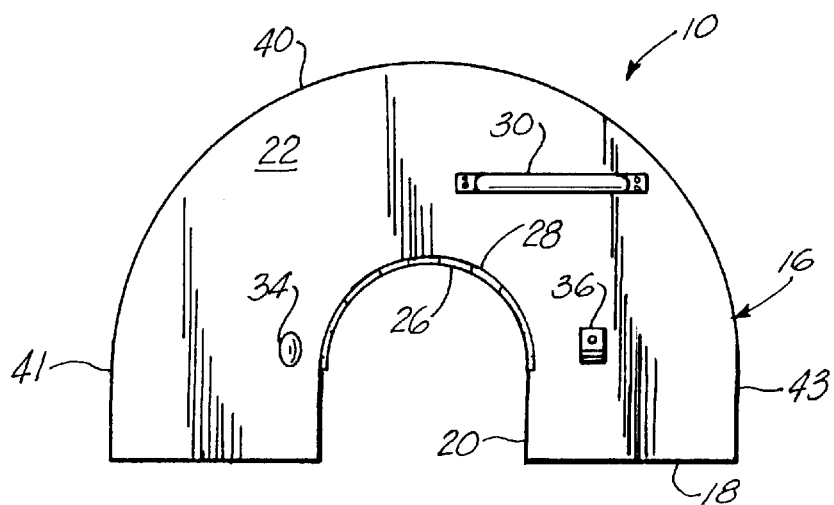
FIG. 2 is a front elevation view of the embodiment of FIG. 1.
Figure 3:
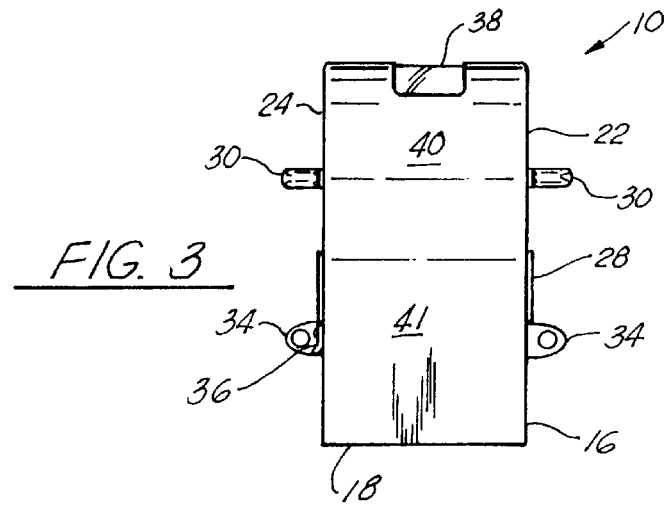
FIG. 3 is a left side elevation view of the embodiment of FIG. 1.
Figure 4:
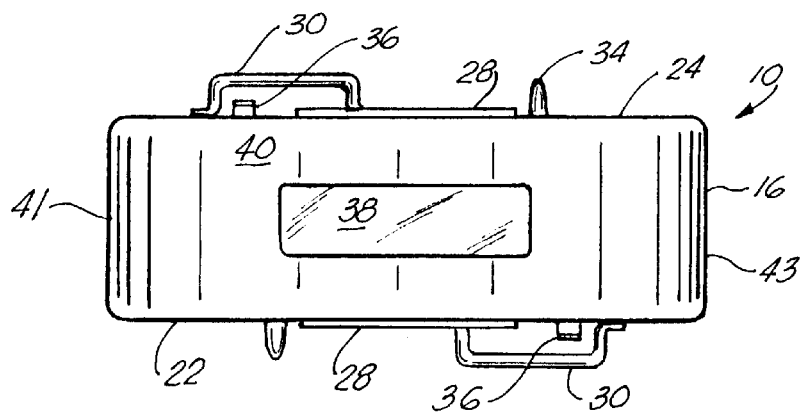
FIG. 4 is a top plan view of the embodiment of FIG. 1.
Figure 5:
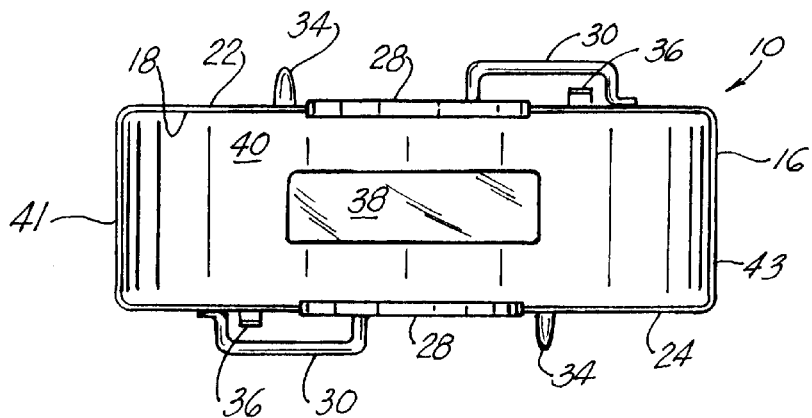
FIG. 5 is a bottom plan view of the embodiment of FIG. 1.
Figure 6:
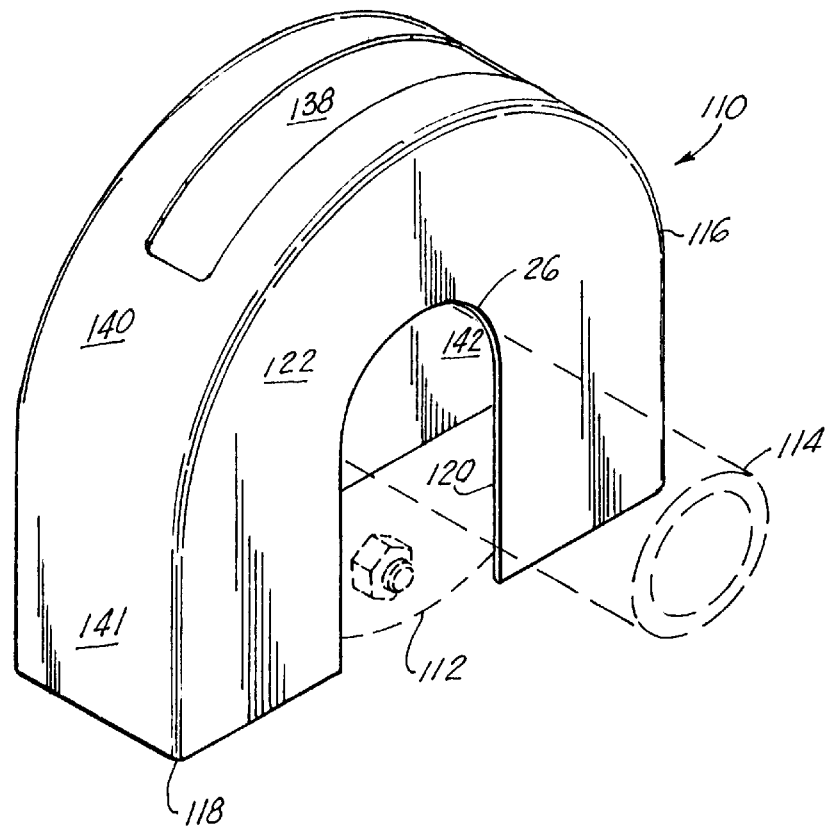
FIG. 6 is a top, front and left side perspective view of an alternate embodiment of the present invention which is used in covering the stopped or plugged end of a pipeline.
Figure 7:
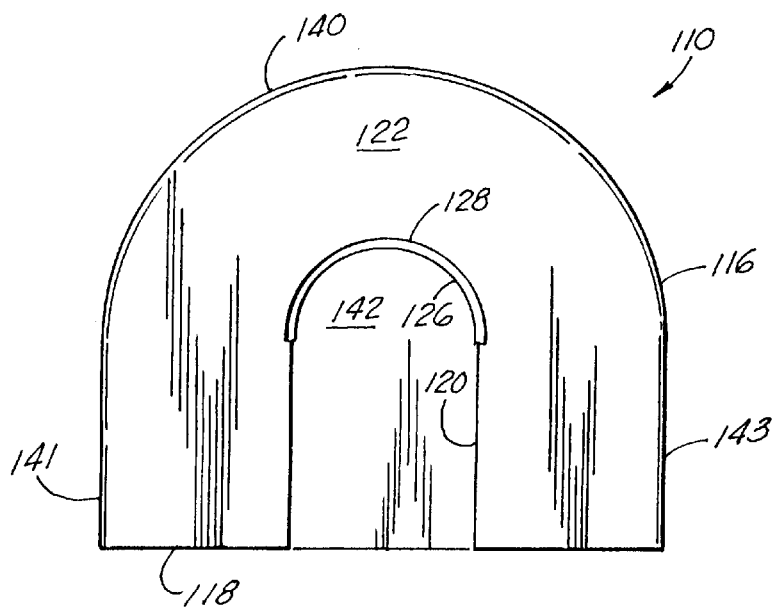
FIG. 7 is a front elevation view of the alternate embodiment of FIG. 6.

Referring initially to FIGS. 1–5, there is shown the preferred embodiment of safety shield 10. This embodiment is designed for use around a fitting or coupling 12 that occurs when separate pipe or hose lengths 14a, 14b are secured together to form a pipeline 14 or the like. While a conventional bolted fitting 12 is shown in the drawing, this is for descriptive purposes only since it should be noted, that shield 10 is also capable of being used to surround more flexible fittings including quick-disconnect or threaded fittings or couplings.

One of the purposes of safety shield 10 is to protect adjacent equipment and personnel from any leakage (which can be sprayed under high pressure) that may occur at pipe fitting or coupling 12. Safety shield 10 is also useful in deflecting any escaping fluid to a drip barrel (not shown) or the like placed under a coupling 12. Safety shield 10 is ideal for use in the marine environment where such quick and easily removed pipe joint coverings are needed.

As indicated in FIGS. 1–5, safety shield 10 consists of an inverted, one-piece, U-shaped or semi-annular trough or housing 16 having front and rear walls 22, 24 formed integrally with a top wall 40 with depending side walls 41, 43 curving downwardly to form the bottom 18 with walls 22, 24., Bottom 18 may be fully open, or bottom 18 may contain an opening therein. In any event, housing 16 is configured such that it is open to the atmosphere at its bottom lower end 18.

This unitary housing 16 is preferably made of a thin, light weight, rigid material, such as sheet metal or thin aluminum plating. However, if desired, housing 16 can also be constructed of plastic, nylon or even hard rubber so long as the material selected for safety shield 10 will not react with the fluid leaking from fitting 12. It is also important for housing 16, and safety shield 10 for that matter, to be sturdy, enough to withstand the forces acting upon it from any fluid (whether a gas or a liquid stream) that may be escaping from fitting 12 under pressure. The purpose of safety shield 10 is to deflect any such leaking fluid downwardly into a drip barrel or other containment device (not shown) for subsequent disposal. In this manner, it will be possible for personnel to freely move around the leaking fitting 12 without being exposed to the leaking fluid or its spray stream. Safety shield 10 also makes it possible for any leaking pipe 14 to be contained so that an unsafe or dangerous situation will not occur.

As can be seen, a notch or curved opening 20 extends through the front and back walls 22 and 24 of housing 16. This notch 20, which stops well before reaching the top wall 40 of housing 16, has an apex 26 which is rounded as indicated thereby forming the U-shape curvature which generally matches that of housing 16. Of course, other shapes may also be suitable for-safety shield 10 (such as V-shaped or square-shaped), but the U-shape of housing 16 is preferable since this shape will most closely conform to the outer periphery or circumference of pipe 14 when installed. Also, it should be noted that in this preferred embodiment of FIGS. 1–5, front and back walls 22 and 24 extend downwardly the same or nearly the same distance. In fact, in this embodiment, front and back walls 22 and 24 can be said to be mirror images of each other.

The inner end or apex 26 of notch 20 is thus generally centrally located within front and back walls 22 and 24 of housing 16, thereby causing this notch 20 to be spaced from the outer perimeter at side walls 41, 43 of housing 16. End 26 of notch 20 would also preferably be reinforced by the inclusion of bearing surface 28 so as to position and more fully distribute the weight of safety shield 10 upon pipe 14. Bearing surface 28 also prevents the thin material of housing 16 from becoming crimped or crumpled during use or from becoming fatigued or worn from repeated use. In any event, notch 10, rounded inner end 26 and bearing surface 28 are sized large enough to fit around a variety of different piping diameters so that one safety shield 10 can be used on many differently sized pipes 14 to enclose and shield their respective fittings 12.

To aid in the placement of safety shield 10 upon pipe 14, handle 30 is mounted on at least one wall, and preferably upon both the front and back walls 22 and 24, of housing 16 away from open end 18. These handles 30 may be centered above notch 20 or they may be placed to one side of notch 20 as shown in FIGS. 1–5. This latter offset position of handles 30 makes it easier to lift safety shield 10 on and off fitting 12 as needed.

To secure safety shield 10 to pipe 14 and around fitting 12, an adjustable strap 32 is employed. This strap 32 extends across notch 20 as shown between two supports or eyelets 34 and 36. Strap 32 is fixedly secured to first support 34 in the normal fashion, such as by stitching, a hook, a knot or the like. However, opposite or second support 36 is configured to enable the length of strap 32 to be adjusted as needed depending on the size of pipe 14. Strap 32 itself may be made of nylon or rope, but it can also be constructed of wire cable, chain or even an elastic material depending on the circumstances. In any event, once safety shield 10 is placed over fitting 12, strap 32 is secured in a typical manner (on both the front and back walls 22 and 24) to retain shield 10 in place. This strap 32 is threaded underneath pipe 14 as shown before it is tightened against the bottom side of pipe 14 (thereby tightening or compressing bearing surface 28 against the top side of pipe 14).

Figure 12:
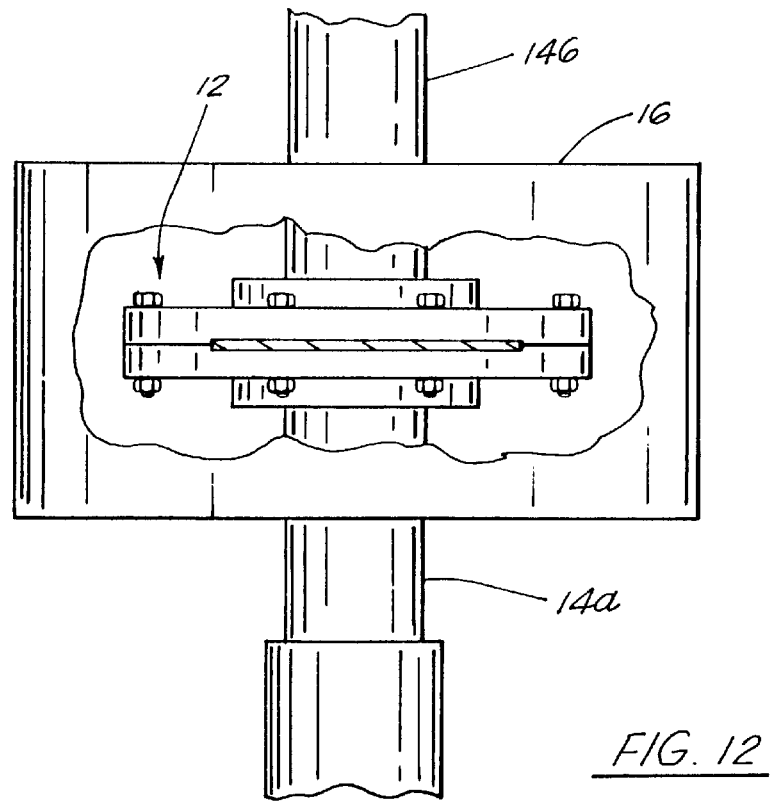
FIG. 12 is a top plan view of the housing of the shield of FIG. 1, partially cut-away, to illustrate a pipe joint formed in a piping system.
Figure 13:
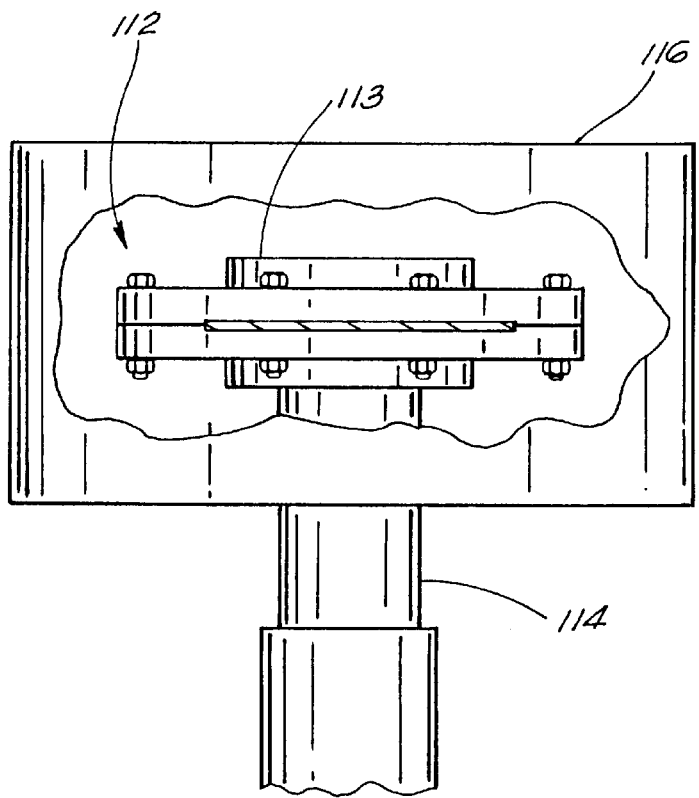
FIG. 13 is a top plan view of the housing of the shield of FIG. 6, partially cut-away, to illustrate the capped or plugged end of a piping system.
Figure 14:
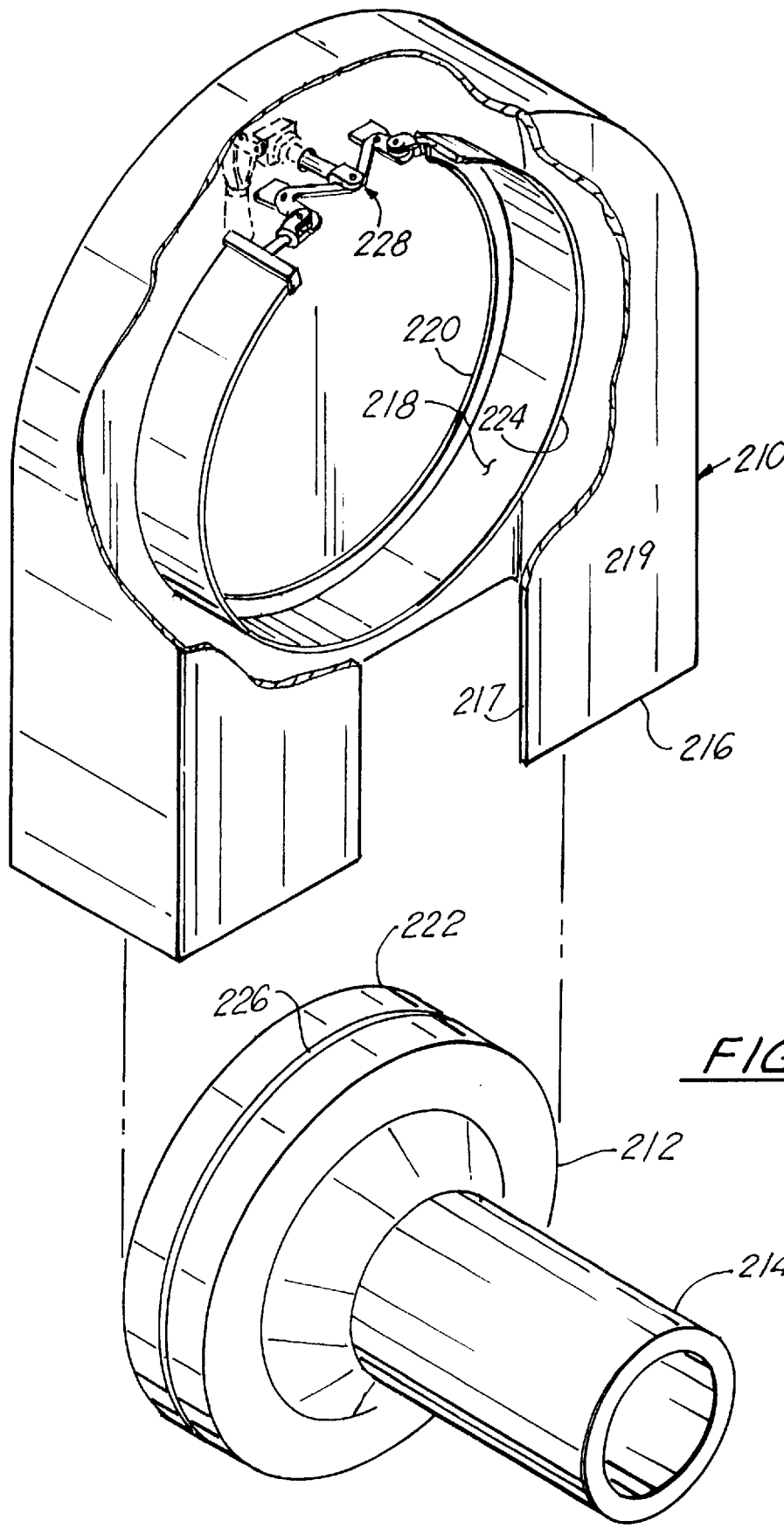
FIG. 14 is a top, front and left side perspective view of another alternate embodiment of the present invention, this view is partially cut-away and illustrates the manner of installing the shield upon the pipe and flange.
Figure 15:
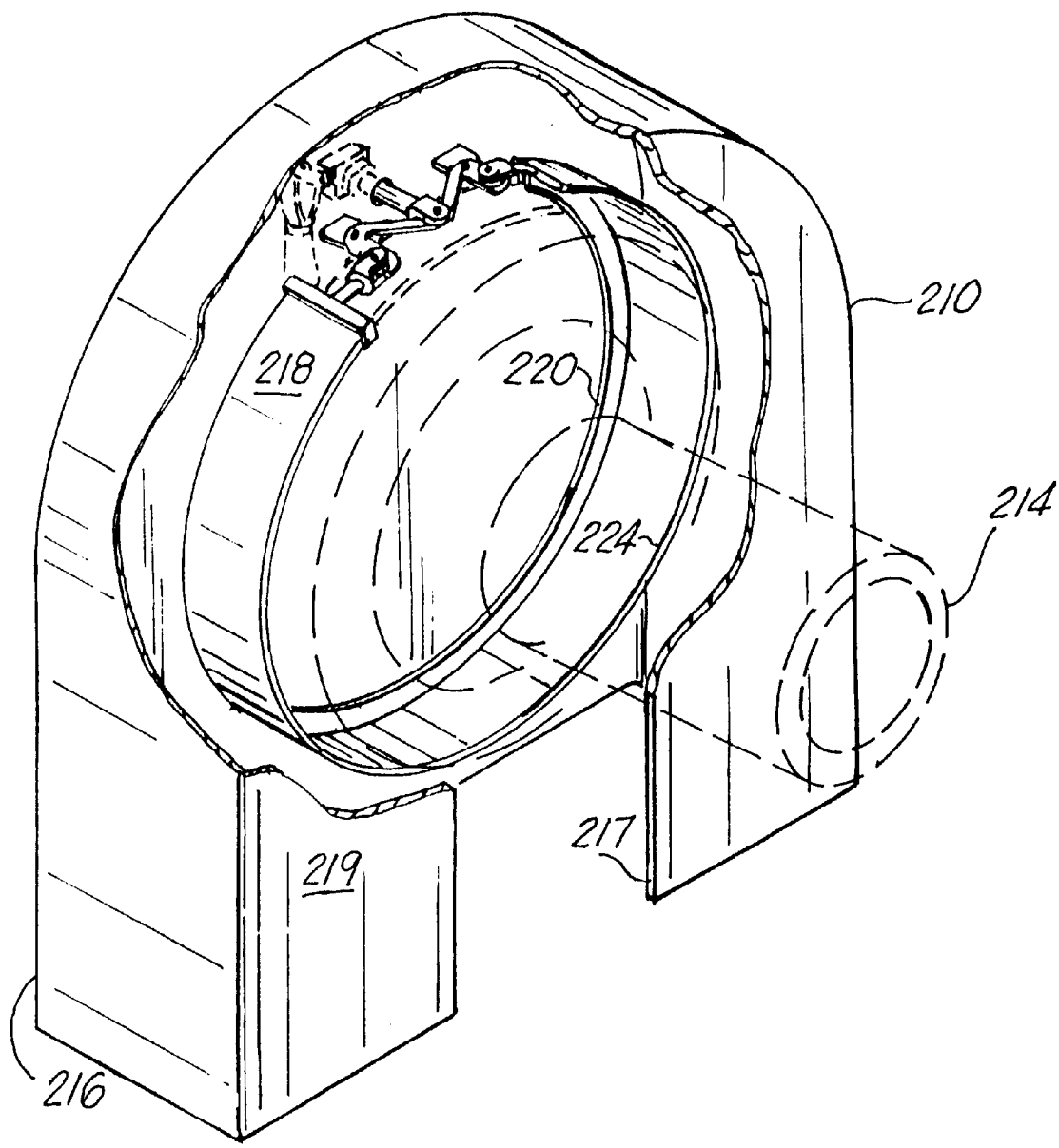
FIG. 15 is a top, front and left side perspective view of the alternate embodiment of FIG. 6, this view is also partially cut-away and shows the manner of attachment of the shield to the pipe and flange which are illustrated in phantom lines.

Once safety shield 10 is placed upon pipe 14 and secured as indicated in FIGS. 1 and 12, fitting 12 will be partially surrounded or enclosed by safety shield 10. This is due to the equal or nearly equal downward extension of both front and back sides 22 and 24. Consequently, any leak from fitting 12 will be deflected by housing 16 downwardly into a lower drip barrel or other containment device (not shown) rather than be allowed to potentially injure nearby personnel and/or equipment. Furthermore, by this manner of attachment (which may simply consist of threading the end of strap 32 through an opening in second support 36), safety shield 10 can be quickly and easily installed and removed without requiring any tools, specialty or otherwise, for such installation or removal. Consequently, shield 10 is ideal for use in the marine environment where it often becomes extremely important and necessary for such quick removal. Such situations may arise due to bad or inclement weather, fire or other calamity, or during wartime when quick and secretive loading or re-fueling is desired.

Also, if desired, a sight window 38 (of clear plastic or hard glass or the like) can be installed within the curved top wall 40 of housing 16. This window 38 aids the worker in both installing and removing shield 10 from around fitting 12. During installation, since shield 10 may be rather large and bulky, window 38 provides the worker with a view of the fitting 12 that is to be covered. During removal, the worker can view the fitting 12 to ascertain where any leak might be so that once shield 10 is removed, he will not come into contact with the leaking fluid or be struck by any stream that might be escaping from fitting 12.

Safety shield 10 is designed for use on a great many different fittings 12, whether rigidly secured fitting such as bolted flanges or flexible or quick-disconnect fittings more commonly found on hoses and the like. Also, the width of curved top or upper wall 40 can be made wide enough so as to accommodate these different fittings 12. Furthermore, as indicated in FIGS. 1 and 12, lower open end 18 of housing 16 extends to the bottom of and preferably past the bottom of pipe or hose 14. In this manner, more coverage of the leaking fitting 12 is accomplished. This downward extension of housing 16 also aids in eliminating any spray that may come from underneath housing 16.

Additionally, it should be stated that the interior surface of shield 10 will generally be spaced from fitting 12 and will not be in direct contact with fitting 12. This is to insure that the maximum view through window 38 can be maintained and to provide for sufficient clearance so that shield 10 can be installed and removed quickly.

Referring now to FIGS. 6–11 and 13, there is shown an alternate embodiment of safety shield 10, generally designated as shield 110. In this embodiment, shield 110 is used at the closed or plugged end 113 of pipe 114 rather than at the joint connecting two pipes 14a, 14b together, as indicated in FIGS. 1–5 and 12 above. In most cases, the construction of the two embodiments would be similar, if not identical. However, in this alternate embodiment, back wall 142 is configured without a notch 120 therein since pipe 14 will not extend through or beyond this shield 110. In any event, it would still be common to construct front and back walls 122 and 124 to the same or nearly the same length. Top or upper wall 140 will be integral and intermediate walls 122, 124 with downwardly depending side walls 141, 143 forming the closure defining open bottom 118.

Additionally, while this alternate embodiment may also include handles 30 for lifting shield 110 and straps 32 and supports 34, 36 for securing shield 110 to pipe length 114 as described above, in most cases, the alternate embodiment of FIGS. 6–11 and 13 can incorporate a different manner of being secured to pipe 14. For stabilizing or supporting shield 110 on pipe length 114, four (more or less) internal rods or stabilizers 144 secured to the underneath or bottom of curved top or upper wall 140 (best seen in FIG. 10) are provided. These stabilizers 144 extend downwardly from the inside of upper wall 140 to an area within housing 116 that is flush or even with that of apex 126. Stabilizers 144 are sized to contact pipe 114, thereby stabilizing shield 110 when placed upon the closed end 113 of piping 114. Generally, both sets of stabilizers 144 will contact pipe length 114, but in some cases, only one set or pair of stabilizers will actually contact pipe length 114. In this manner, the top wall 140 of shield 110 will still be spaced from the end 113 of piping 114 rather than resting directly upon this end.

During operation, such as when loading or unloading in a marine environment or when employing hoses or pipes whose end fittings 112 are prone to leak, a worker will simply place the correct shield 110 over the leaky end fitting 112 so that such leaks will now be contained. The manner of attachment to the leaking pipe length 114 can consist simply of placing shield 110 upon pipe as in the embodiment shown in FIGS. 6–11 and 13 or shield 110 can be secured to pipe length 114 via one or more adjustable straps 32. In both cases, curved or rounded notch 126 in at least front wall 122 (and also the back wall of FIGS. 1–5), and its bearing surface 128 will contact pipe length 114 and help retain shield 110 in place. In the embodiment of FIGS. 6–11 and 13, stabilizer rods 144 that extend within housing 116 as shown will further aid in securing shield 110 upon pipe length 114.

Referring now to FIGS. 14–17, there is shown a further embodiment of safety shields 10 and 110. In this embodiment, safety shield 210 is designed for attachment to end flange 212 of plugged or sealed pipe 214. Safety shield 210 consists of housing 216 with notch 217 in its front wall 219 much the same as notch 120 in housing 116. Housing 216 may also include a window (not shown) therein much the same as windows 38 and 138 of shields 10 and 110. In fact, shield 210 is configured similar to shields 10 and 110 and will share many of the same features and components thereof. However, the manner of attachment of safety shield 210 to pipe 214 is unique from the methods previously described.

In the version shown in FIGS. 14–17, safety shield 210 incorporates an open annular ring 218 therein which is preferably constructed of a thin metal plate that has been rounded or bent into the circular shape as shown. However, other shapes and/or materials may be utilized as well. The outermost elongated side of open ring 218 is configured with a lip 220 that is used as a stop. During installation, open ring 218 is slid over and around closure plate 222 which forms a part of end flange 212 until lip 220 and the outer edge or surface of closure plate 222 meet. This lip 220 thus prevents ring 218 from sliding too far over closure plate 222 and/or flange 212.

Additionally, it is expected that the opposite or innermost elongated side of ring 218 would also be configured with a slight inwardly directed overhang or protrusion 224. However, this overhang or protrusion 224 would not generally extend as far radially inward as does lip 220 (although in some models, this overhang or protrusion 224 may extend the same distance inwardly). Such overhang or protrusion 224 is useful in grasping and fitting within the slight gap 226 existing between flange 212 and its closure plate 222. Consequently, when safety shield 210 is installed with this overhang or protrusion 224 within gap 226, safety shield 210 is not easily dislodged until overhang or protrusion 224 is removed from within gap 226.

Figure 16:
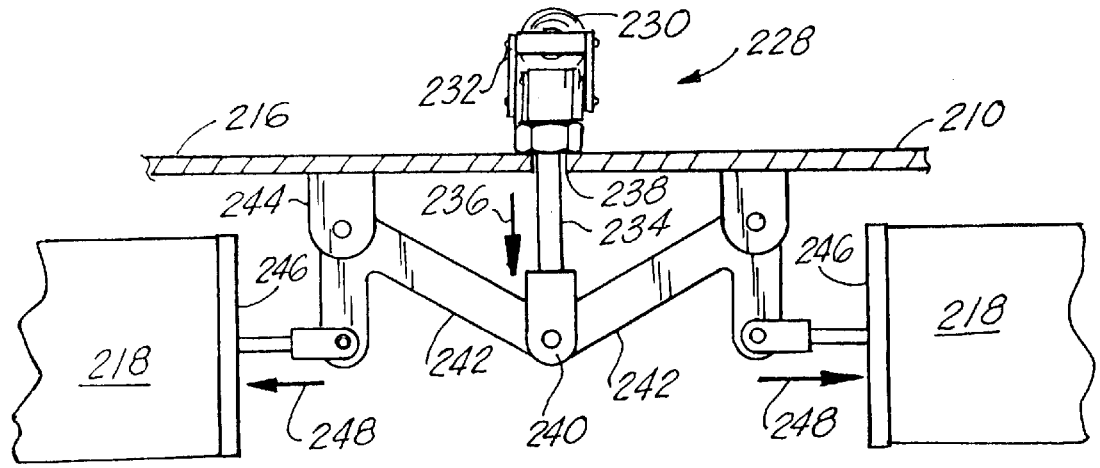
FIG. 16 is a top plan view of the attachment means utilized in the alternate embodiment of FIG. 14, these attachment means are shown in the open or unclasped position; and, FIG. 17 is a top plan view of the attachment means utilized in the alternate, embodiment of FIG. 14, these attachment means are shown in the closed or clasped position.
Figure 17:
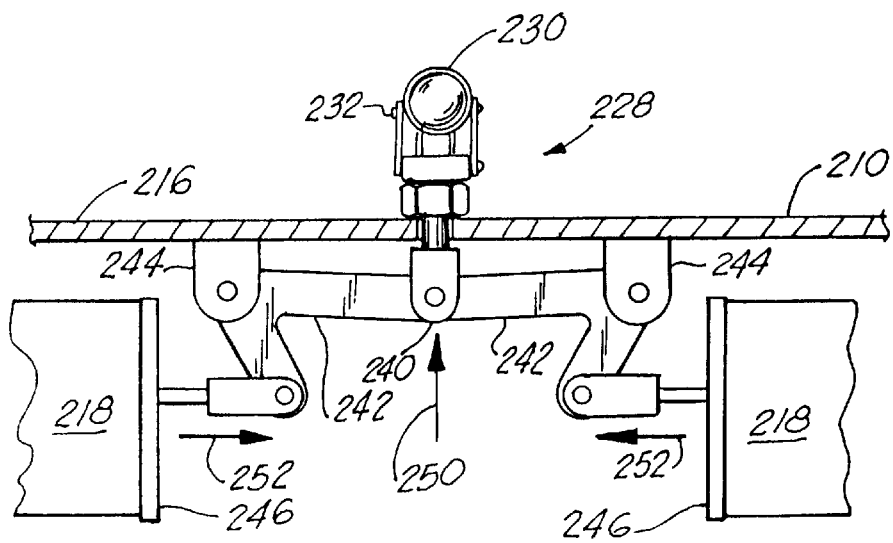

As seen in better detail in FIGS. 16 and 17, the opposite elongated ends of open ring 218 are each secured to attachment assembly 228. It is this attachment assembly 228 that causes open ring 218 to either clasp or un-clasp closure plate 222 by varying the diameter of open ring 218. Such operation is quickly and easily accomplished by simply rotating handle 230 about hinge 232. Both handle 230 and hinge 232 are located outside safety shield 210 for ease of use and accessibility whereas the remainder of attachment assembly 228 is generally located within the enclosure of safety shield 210.

FIG. 16 discloses attachment assembly 228 in the open or unclasped position. It is this position that safety shield 210 is in during either the installation or removal operations since overhang or protrusion 224 of ring 218 must be either positioned within or removed from gap 226. Ring 218 is placed in this position by rotating handle 230 as shown. Such rotation causes shaft 234 to move downwardly, as indicated by arrow 236, through opening 238 in safety shield 210. The end of shaft 234 is secured to pivotal joint 240 which, in turn, is secured to oppositely located pivot arms 242. These pivot arms 242 are, as indicated, pivotally mounted to safety shield 210 via hinge supports 244. The opposite ends of these pivot arms 242 are each secured to a connector 246 which, in turn, is secured to the opposite elongated ends of ring 218. In,this fashion, ring 218 is freely suspended from hinge supports 244 and also from shaft 234 thereby allowing ring 218 to freely move or be positioned as needed.

During operation, the downward movement of shaft 234 causes pivot arms 242 to move or rotate about hinge supports 244 thereby causing their opposite elongated ends, as well as connectors 246, to move outwardly as indicated by arrows 248. The resulting increase in the diameter (as well as circumference) of ring 218 enables ring 218 to now be positioned over closure plate 222 thereby permitting overhang or protrusion 224 to be positioned above gap 226. However, at the same time, lip 220 prevents ring 218 from being positioned too far over closure plate 222 by limiting the further positioning of ring 218.

Once ring 218 is properly positioned, handle 230 is rotated to the position shown in FIG. 17 to secure ring 218 about closure plate 222 and/or flange 212. Such rotation of handle 230 causes shaft 234 to move upwardly through opening 238 as indicated by arrow 250. This, in turn, causes pivot arms 242 to move causing their elongated ends, as well as connectors 246, to move inwardly as indicated by arrows 252. Such inward movement of connectors 246 results in a reduction in the diameter (as well as circumference) of ring 218. This reduction in diameter of ring 218 will cause overhang or protrusion 224 to be inserted within gap 226 while ring 218 is compressed against closure plate 222 and/or flange 212.

Of course, the inwardly extending distance of overhang or protrusion 224 must be such that the reduction in diameter of ring 218 by attachment assembly 228 will enable ring 218, and hence safety shield 210, to be secured to closure plate 222 or flange 212. If this inwardly extending distance is too great, then it may not be possible to mount ring 218 around closure plate 222 in the first place. Alternatively, if this inwardly extending distance is too little, or if there is no such overhang or protrusion, then the reduction in diameter of ring 218 must be sufficient enough to firmly grasp closure plate 222 and/or flange 212. Also, it should be noted, that in some cases, the full rotation of handle 230 about hinge 232 may not be required to firmly secure ring about closure plate 222 since only a partial rotation of handle 230 may suffice. In this fashion, a great many different diameters of end flange 212 can be accommodated by a single safety shield 210.

From the above, it can easily be ascertained that by simply rotating handle 230, safety shield 210 can be easily and quickly installed and/or removed as desired or as the needs dictate. Also, the amount of change in the diameter of ring 218 can be adjusted by altering the amount of travel permitted by shaft 234. This can be accomplished by utilizing different handle/shaft assemblies which are commonly available. Additionally, while this embodiment is disclosed wherein both elongated ends of ring 218 are moved simultaneously either toward or away from each other, other embodiments may employ a ring 218 wherein one end is fixed and the other end is selectively moved with respect to this fixed end so as to vary the diameter of ring 218.

While the above description is with respect to a shield configured substantially as shown, it is understood that many different versions and/or configurations of shields 10, 110, and/or 210 are possible that would still employ the advantages of this invention as now disclosed. Thus, these various versions and/or configurations are to be deemed to be included and anticipated by the above description. For example, shields 10, 110 or 210 could be square or box shaped rather than the U or semi-annular shape now shown. Also, the size and configuration of notches 20, 120 or 217 can be different and the manner of attachment can vary if so desired.

As indicated earlier, this safety shield is ideally suited for use in the marine environment where a flexible and quickly disconnecting pipe covering is desirable. Such a quick disconnecting assembly is preferable since rough sea conditions can occur rather quickly which would warrant the immediate discontinuation of any loading or discharging. Also, under war time conditions, a quick disconnect is desirable for military refueling, and a manner of insuring that surrounding personnel do not become exposed to the transferring fluid which may leak from the pipe or hose is still needed. Furthermore, if after coupling, it becomes imperative to de-couple (such as due to fire or other conditions), the housing surrounding the coupling must also be quickly removed. These features are all accomplished by these safety shields as described above.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A shield for surrounding or covering an end flange of a pipeline or hose comprising:

(a) a housing having a front wall, a back wall and a top wall, said top wall depending downwardly to form side walls intermediate said front and back walls thus forming a closure having a bottom which is open to the atmosphere;

(b) a notch provided in said front wall of said housing, said notch being configured to accept a pipeline therein with the apex of said notch being generally centrally located within said front wall of said housing; and, (c) attachment means secured to said housing for positioning said housing upon said pipeline, said attachment means comprising an open annular ring whose diameter can be adjusted to selectively engage or disengage the end flange.

2. The safety shield as set forth in claim 1, wherein the opposite elongated ends of said open annular ring are each secured to a connector and wherein at least one said connector is moved to vary the diameter of said open annular ring.

3. The safety shield as set forth in claim 2, wherein both said connectors are respectively secured to separate pivot arms and wherein both said pivot arms are secured to a handle assembly which is selectively moved to pivot both said pivot arms.

4. The safety shield as set forth in claim 3, wherein both said pivot arms are pivotally secured to said housing.

5. The safety shield as set forth in claim 1, wherein said open annular ring comprises a first elongated lip extending radially inward from a first edge of said ring, said first elongated lip forming a stop.

6. The safety shield as set forth in claim 5, wherein said open annular ring comprises a second elongated overhang or protrusion extending radially inward from a second opposite edge of said ring, said second elongated overhang or protrusion being inserted in a gap in the end flange of the pipeline.

7. A shield for surrounding or covering an end flange of a pipeline or hose comprising:

(a) a housing having a front wall, a back wall and a top wall, said top wall depending downwardly to form side walls intermediate said front and back walls thus forming an integral closure having a bottom which is open to the atmosphere;

(b) a notch provided in said front wall of said housing, said notch being configured to accept a pipeline therein with the apex of said notch being generally centrally located within said front wall of said housing;

(c) means for positioning said housing upon said pipeline, said means including a bearing surface provided along said apex of said notch for accepting said pipeline therealong; and, (d) means for temporarily fastening said housing to said pipeline, said fastening means being secured to said back wall of said housing and comprising an adjustable strap extending around and compressible against the outer circumference of the end flange.

8. The safety shield as set forth in claim 7, wherein said fastening means comprise an open annular ring whose diameter can be selectively adjusted to selectively engage or disengage the outer circumference of the end flange.

9. The safety shield as set forth in claim 8, wherein the opposite elongated ends of said open annular ring are each secured to a connector and wherein at least one said connector is moved to vary the diameter of said open annular ring.

10. The safety shield as set forth in claim 9, wherein both said connectors are respectively secured to separate pivot arms and wherein both said pivot arms are secured to a handle assembly which is selectively moved to pivot both said pivot arms.

11. The safety shield as set forth in claim 10, wherein both said pivot arms are pivotally secured to said housing.

12. The safety shield as set forth in claim 9, wherein said open annular ring comprises a first elongated lip extending radially inward from a first edge of said ring, said first elongated lip forming a stop.

13. The safety shield as set forth in claim 12, wherein said open annular ring comprises a second elongated overhang or protrusion extending radially inward from a second opposite edge of said ring, said second elongated overhang or protrusion being inserted in a gap in the end flange of the pipeline.

14. A method of shielding or surrounding an end flange of a pipeline or hose comprising the steps of:

(a) providing a housing having a front wall, a back wall and a top wall depending downwardly to form side walls intermediate said front and back walls thus forming a closure having a bottom which is open to the atmosphere;

(b) providing said housing with a notch in said front wall of said housing, said notch being configured to accept a pipeline therein with the apex of said notch being generally centrally located within said front wall of said housing;

(c) providing means for positioning said housing upon the pipeline; and, (d) temporarily fastening said housing to the pipeline via fastening means, said fastening means being secured to said back wall of said housing and comprising an adjustable strap extending around and compressible against the outer circumference of the end flange.

15. The method as set forth in claim 14 further comprising the step of configuring said adjustable strap as an open annular ring whose diameter can be selectively adjusted to selectively engage or disengage the outer circumference of the end flange.

16. The method as set forth in claim 15 further comprising the step of securing the opposite elongated ends of said open annular ring to a connector and wherein at least one said connector is moved to vary the diameter of said open annular ring.

17. The method as set forth in claim 16 further comprising the step of securing both said connectors to separate pivot arms and wherein both said pivot arms are secured to a handle assembly which is selectively moved to pivot both said pivot arms.

18. The method as set forth in claim 17 further comprising the step of pivotally securing both said pivot arms to said housing.

19. The method as set forth in claim 15 further comprising the step of configuring said open annular ring with a first elongated lip extending radially inward from a first edge of said ring, said first elongated lip forming a stop.

20. The method as set forth in claim 19 further comprising the step of configuring said open annular ring with a second elongated overhang or protrusion extending radially inward from a second opposite edge of said ring, said second elongated overhang or protrusion being inserted in a gap in the end flange of the pipeline.

* * * * *